United States Patent
Spencer

[15] 3,662,598
[45] May 16, 1972

[54] FLOW CONTROL SYSTEM

[72] Inventor: Jordan L. Spencer, 560 Riverside Drive, New York, N.Y. 10025

[22] Filed: Apr. 7, 1971

[21] Appl. No.: 131,945

Related U.S. Application Data

[62] Division of Ser. No. 831,351, June 9, 1969, Pat. No. 3,605,741.

[52] U.S. Cl. ........................................................73/194 E
[51] Int. Cl. ..............................................................G01f 1/00
[58] Field of Search ...................................73/194 E, 194 R

[56] References Cited

UNITED STATES PATENTS 455,571  7/1891  Menzie..................................73/194 R

FOREIGN PATENTS OR APPLICATIONS 895,364  5/1962  Great Britain ......................73/194 R Primary Examiner—James J. Gill
Attorney—Robert I. Pearlman

[57] ABSTRACT

The present invention deals with an improved method and apparatus for measuring flow in fluid flow systems characterized by low flow rate. The invention utilizes the transit time or oscillatory frequency of a ball or float which moves along the direction of fluid flow and is returned to its original position by actuating a magnetic return system as it breaks a light beam or other sensing system. The cycle is repeated, with the transit time or oscillatory frequency being related to rate of fluid flow, and thus serving to indicate same for control purposes. The flow tube-ball measuring unit may take the form of a disposable insert into the flow measuring system.

12 Claims, 4 Drawing Figures

INVENTOR
JORDAN L. SPENCER

ATTORNEY

FLOW CONTROL SYSTEM

RELATED APPLICATIONS

This is a divisional application of U.S. Ser. No. 831,351, filed June 9, 1969 for the present inventor, now U.S. Pat. No. 3,605,741.

BACKGROUND OF INVENTION

Control of flow when utilizing extremely low flow rates has presented a considerable problem. By way of example, intravenous feed means, e.g. for food, blood, drug, administration, etc., are used in numerous medical applications. Typically, a suitable chamber is provided as a reservoir of the solution to be fed, with tubing leading to an intravenous needle for injection at the venipuncture point. A tube clamp is normally placed along the feed tube for flow control. The proper and reliable control of the rate of administration of these fluids is essential to patient management and recovery. It may vary from a few cubic centimeters per hour to several cubic centimeters per minute. Drop counting by nurses has proven to be highly inefficient.

The methods heretofore employed for monitoring and controlling such low flow rates have been time-consuming, and of limited accuracy.

The present invention serves to readily monitor and indicate low flow rates by automatic means, with a high degree of accuracy over a wide range of flow conditions. It can be combined with suitable warning devices to indicate the cut-off of flow, or change above or below set levels. Further, it can take the form of a low cost, disposable tube-and-ball assembly (sterile, if desired) which can readily be inserted into the fluid flow line so as to operate with a sensing magnetic measuring unit.

SUMMARY OF INVENTION

In accordance with the present invention, a ball or float responding to magnetic force is placed in a tubular section of the intravenous feed line. As the ball moves with fluid flow it cuts across a sensing device such as an optical sensor which in turn activates magnetic means which return the ball to its former position in the flow line. The ball then repeats its cycle. The frequency of the resulting oscillations is proportional to the fluid flow rate, and can be used to produce an output which indicates flow rate. Alternately the transit time of the ball across a portion of the tube can be determined. These in turn can be interrelated with suitable warning or control systems and the like for adjusting flow to desired levels, target flows being readily indicated by the metering unit.

There are various modifications of the above-described system essentially comprising a float or ball moving in a tube which is detected and returned magnetically to its starting position, with flow rate being computed from the cycle periods for repeating the oscillating movement of the ball or float.

Any type of tubing suitable for flow of fluid can be used, e.g. glass, plastic, etc., of any desired cross-section (normally round). Particularly when employing the invention in the form of a disposable tube-float assembly, suitable stops are provided at the ends of the tube insert to prevent the float from leaving the tube, as will be made more clearly apparent with reference to the drawings.

The float, which preferably is in the form of a ball, generally has a cross-sectional area about 50 to 80 percent of the tube cross-section, and can be made of various materials so long as it is responsive to a magnetic field for returning it to its initial position. It can be a sphere of soft iron, with or without a coating to protect against corrosion. Alternatively, it can be a glass or plastic sphere with a soft iron core or having iron filings dispersed therein. In an embodiment particularly preferred for low flow rates and illustrated in FIG. 4, it may comprise a combination of a plastic whose density approximates that of the flowing fluid, and a second iron-containing sphere used to return the plastic sphere to its starting point.

The detection means for determining that the float or ball has passed a selected point in the tube can also take various forms. It can be an optical detector wherein the ball breaks or partially obscures a beam of light which passes across the transparent tube and impinges on a photo resistor, photo tube or similar device. Alternatively, and especially in the case of opaque fluids, the float can be relatively transparent, thus permitting the flow of light to the photocell and resultant detection.

Inductive detectors can also be used. By the float or ball passing through or near a small coil of wire placed near or around the tube, it can change the inductance of the coil and alter the frequency of an oscillator of which the coil is a part. Somewhat similarly, two plates of a capacitor which is connected to an oscillator circuit can be employed. The movement of the ball between the plates changes the capacitance, thus changing the frequency at which the oscillator operates.

Regardless of the type of detector utilized, it serves to actuate electromagnetic means for returning the ball or float to its initial position. The pole pieces of the magnet are placed on either side of the tube and shaped to give an inhomogenous magnetic field which exerts a force on the float. When the detector has been stimulated by the crossing of the float, it actuates a pulse of current of selected amplitude and duration to cause the magnet to act on the float and smoothly return it to its starting point. As illustrated in FIG. 4, two or more magnets can be employed when utilizing a multiple ball system.

The means for computing and indicating flow by virtue of the oscillations of the ball-float can also be varied. The preferred method is to determine the time necessary for the ball to traverse length L (the distance between its initial position and point of detection and return), the resulting value being proportional to average fluid velocity and thus volumetric flow. The combination of two detectors, starting a counter at an initial flow point and stopping it at the detector, can be used. (The input to the counter is a fixed frequency.) The output of the counter system can be displayed directly or inverted to provide a digital signal proportional to flow which may be displayed on a standard meter or the like. More sophisticated systems for integrating the flow signal to provide a signal proportional to total volume of fluid used can be combined with means for setting off an alarm or the like when a preset proportion of the intravenous feed reservoir has been emptied.

The various aspects of the present invention will be made more clear by reference to the following drawings and accompanying description.

DRAWINGS

Figure 1:
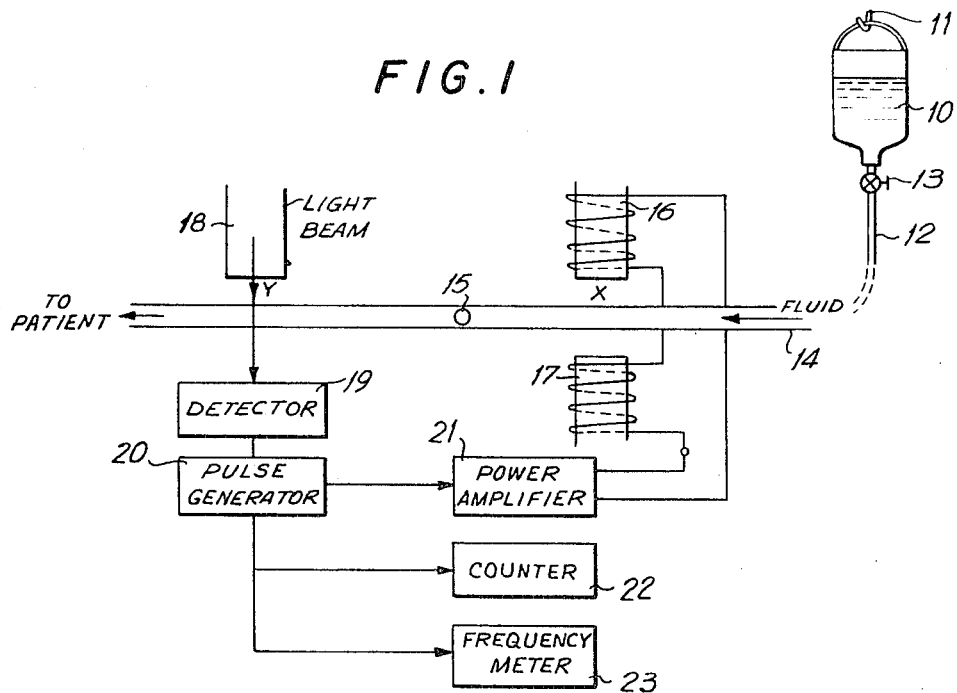
FIG. 1 illustrates a basic system employing the present invention.

With reference to FIG. 1, shown therein is a simplified system illustrating the present invention. For purpose of illustration, a system for effecting intravenous feeding characterized by low flow rates will be described, although the invention is applicable to all systems characterized by low flow rates.

Reservoir 10 contains the fluid to be injected intravenously suspended by element 11. Tubing 12 serves as a passage for the fluid to be administered with valve means 13 or other flow control element being positioned therein to vary flow rate, all as is conventional.

Figure 3:
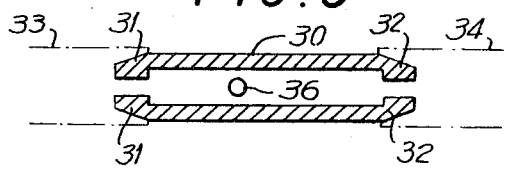
FIG. 3 shows a tube and flow assembly suitable as a sterile disposable element.

The remainder of tubing 12 is not shown other than tubing section 14 which illustrates the operation of the present invention, and can be simply a portion of tubing 12 or an insert thereto as sown in FIG. 3. Tubing 14 in normal operation is preferably in horizontal position.

Figure 2:
FIG. 2 depicts a ball float comprising an iron core surrounded by a plastic coating.

Float element 15, normally in the form of a ball or sphere is positioned in tubing section 14. It is responsive to magnetic force and may be metallic, plastic with metal, e.g. iron, filing dispersed therein, or plastic or glass with a metallic core, the latter being illustrated by FIG. 2.

Magnetic means comprising soft iron poles 16 and 17 are positioned in proximity to said tube 14 at an upstream end thereof relative to the direction of fluid flow.

Sensor means are positioned at a downstream portion of the tube denoted Y, generally only about 0.5 to 1.5 inches from point X, the position of the magnetic means. As shown, the sensor means take the form of an optical sensor of conventional type comprising light beam source 18 and detector element 19.

Ball 15 is moved by the flow of fluid in the tube from its initial position at X to point Y, at which time it crosses the light beam provided by unit 18. The interruption of the light beam is translated to an electrical pulse of fixed duration by unit 20 and amplified by amplifier 21 so as to actuate magnets 16 and 17. The magnetic field thus formed serves to attract ball 15 and return it to its initial position X. The magnetic force is halted when the pulse of current to the electro magnet ceases, and the cycle is then repeated with the ball 15 moving down the tube responsive to fluid flow to again trip the sensing unit, etc.

The frequency of the cycles or ball oscillations thus created is proportional to the fluid flow rate through tubing 14. It is translated into an indication of fluid flow readily ascertained by the individual or mechanical and/or electrical means for altering fluid flow rate to described levels by flow control means 13 or the like.

In the system shown in FIG. 1 the pulse generated by detector 19 and unit 20 is fed to counter 22 which records the frequency of oscillation and transfers this information into a calibrated frequency or flow meter which directly indicates the rate of flow of the fluid.

The flow meter can be associated with an alarm unit to alert when flow has dropped below a given level, or combined with an integrator system to show total volume of fluid flow.

FIG. 3 depicts a disposable, sterile insert 30 which may be used in conjunction with the present invention. The magnetic, sensing and metering unit may be a compact combination unit placed by the bedside of the patient, with an intravenous feed system and injection means removably connected thereto to permit change of fluids, removal to other patients, etc.

In such a system disposable element 30 containing ball float 36 acts as section tubing 14 of FIG. 1, and is placed between the sensing and magnetic units in the approximate length between X and Y of FIG. 1. Normally this is done by simply connecting ends 31 and 32 into the normal feed tubing 33 and 34 and clipping element 30 into proximity with the sensing and magnetic means. Ends 31 and 32 preferably are of reduced cross section so that ball 36 remains therein during normal storage, handling, etc.

The disposable element of FIG. 3 may be plastic such as vinyl chloride or polymethyl methacrylate, glass, etc., readily sterilized, inserted and disposed of to permit flexible and sterile utilization of the present system for measuring flow.

Figure 4:
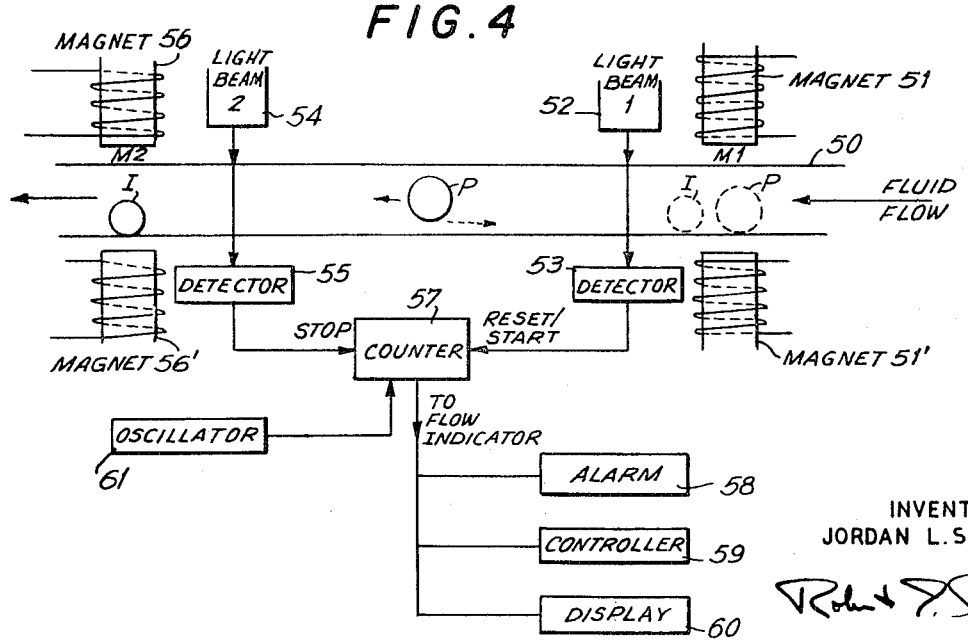
FIG. 4 illustrates the use of multiple detectors and magnets for utilization with a multiple ball system especially suitable for low flow rates.

FIG. 4 illustrates a more sophisticated system, especially suitable for accurate measurement of low flow rates and comprising a dual float, magnet, and sensor system.

As described relative to FIG. 1, tubing section 50 may be in the normal conduit for flow of the intravenous liquid from reservoir to patient. Positioned therein are two balls P and I. Ball I is metallic, preferably iron, and responsive to magnetic force. Ball P is plastic or glass and of similar density to the intravenous feed fluid so as to move almost frictionlessly with the latter's flow.

Initially both balls are at point $M_1$ and magnets 51 and 51' are inactive. Magnet 56, 56' is then pulsed so as to move ball I rapidly toward position $M_2$. The flow of fluid then moves plastic ball P along tubing 15 until it crosses the light beam of light source 54 alerting detector 55. The detector then actuates magnets 51 and 51' in the same manner as described relative to FIG. 1, returning ball I and along with it ball P to point $M_1$. This cycle is repeated at a frequency related to flow rate.

A second sensor unit 52, 53 may be utilized for improving the accuracy of the oscillation measurement and thus fluid flow. As ball P passes the light beam from unit 52 it trips detector 53 which in turn resets and starts a counter 57 which counts pulses from an oscillator 61. When ball P then crosses unit 54, 55 the counter 57 is stopped. The number of pulses thus counted by counter 57 are in turn related to a flow indicator which has been calibrated to give fluid flow relative to the accumulated count.

This count can also be used to actuate a controller 59, an alarm 58, a flow rate display 60, or similar system.

While the invention has particular advantage in controlling flow for intravenous feeding, it can be used in other ways where extremely low flow rates are involved and it is necessary to have a ready and inherently digital indication of flow not normally available by conventional flow meters, e.g. rotameters, and the like.

Having described the present invention, that which is sought to be protected is set forth in the following claims.

I claim:

1. Apparatus for indicating low volumetric rates of flow comprising conduit means, a float element having a magnetic responsive material associated therewith positioned in said conduit, magnetic means positioned on an upstream section of said conduit and sensor means positioned at a downstream section of said conduit, said sensor means actuating said magnetic means when said float element moving with the direction of fluid flow crosses said sensor, thereby returning said float element to its original position, and indicator means for relating fluid flow to the cycles of said float element.

2. The apparatus of claim 1 wherein said float element is a ball of non-metallic material having sufficient iron therein to be responsive to said magnetic means.

3. The apparatus of claim 1 where said float means comprises a metal ball.

4. The apparatus of claim 1 wherein said sensing element is an optical sensor.

5. The apparatus of claim 1 wherein the pole pieces of said magnetic means are placed on either side of said tube and shaped to give an inhomogenous magnetic field.

6. The apparatus of claim 1 which further comprises computing means for relating the cyclic frequency of said float element to fluid flow rate.

7. The apparatus of claim 1 which further comprises control means actuated by said means for indicating flow volume for adjusting fluid flow when it varies from a predetermined level.

8. The apparatus of claim 1 wherein said means for indicating fluid flow includes tubing means having positioned therein a freely movable ball element having a magnetic responsive material associated therewith, said magnetic means being positioned in proximity to said tubing means at an upstream portion thereof, sensing means positioned at a downstream section of said tubing means, said sensing means actuating said magnetic means when said ball element crosses its position so as to return said ball to an initial position, and indicator means for relating fluid flow to the cycles of said ball element.

9. The apparatus of claim 8 comprising a metallic ball responsive to magnetic force positioned in said tubing means, the action of said magnetic means on said metallic ball serving to return said plastic ball to its initial position.

10. The apparatus of claim 9 containing both a metallic ball element and a plastic ball element, and in which said means for indicating flow comprises at least two sets of magnetic means, the upstream magnet being actuated to initially move said metallic ball downstream ahead of said plastic ball so as to permit the plastic ball to move freely with fluid flow before crossing said sensing element and initiating the magnetic return of both balls to their initial position.

11. A disposable insert adapted to be used in the apparatus of claim 1 comprising a relatively short length of tubing, float means having a magnetic responsive material associated therewith placed in said tube and freely movable therein but contained by the ends of said tubing, said disposable insert being adapted to be inserted into said conduit means so as to co-act with said sensor and magnetic means, the cyclic movement of said float means serving to indicate fluid flow.

12. The disposable insert of claim 11 wherein said float means is a ball having iron in its internal portion.

* * * * *